(No Model.)  2 Sheets—Sheet 1.

A. C. EVANS.
COMBINED DRILL AND FERTILIZER DISTRIBUTER FOR ONE HORSE PLANTERS.

No. 294,313. Patented Feb. 26, 1884.

Attest
H. K. Wells.
G. W. Gridley.

Inventor
Austin C. Evans
By B. C. Converse, Atty.

(No Model.) 2 Sheets—Sheet 2.

A. C. EVANS.
COMBINED DRILL AND FERTILIZER DISTRIBUTER FOR ONE HORSE PLANTERS.

No. 294,313. Patented Feb. 26, 1884.

Attest
L. K. Wells
G. M. Gridley

Inventor
Austin C. Evans
By B. C. Converse Atty.

UNITED STATES PATENT OFFICE.

AUSTIN C. EVANS, OF SPRINGFIELD, OHIO.

COMBINED DRILL AND FERTILIZER-DISTRIBUTER FOR ONE-HORSE PLANTERS.

SPECIFICATION forming part of Letters Patent No. 294,313, dated February 26, 1884.

Application filed June 21, 1883. (No model.)

*To all whom it may concern:*

Be it known that I, AUSTIN C. EVANS, a citizen of the United States, residing at the city of Springfield, in the county of Clarke and State of Ohio, have invented a new Combined Drill and Fertilizer-Distributer for One-Horse Planters; and I do hereby declare that the following is a full, clear, and exact description thereof, reference being had to the drawings hereto annexed, making a part of this specification.

My invention relates to a one-horse combined corn-drill and fertilizer-distributer; and it consists of improvements in both the drill and fertilizer attachment, which will be hereinafter fully described.

The object of my invention is to provide means for preventing the fertilizer-disk from becoming clogged or bound by the packing of the fertilizer substance between it and the bottom plate, so as to stop its rotation.

Figure 1:
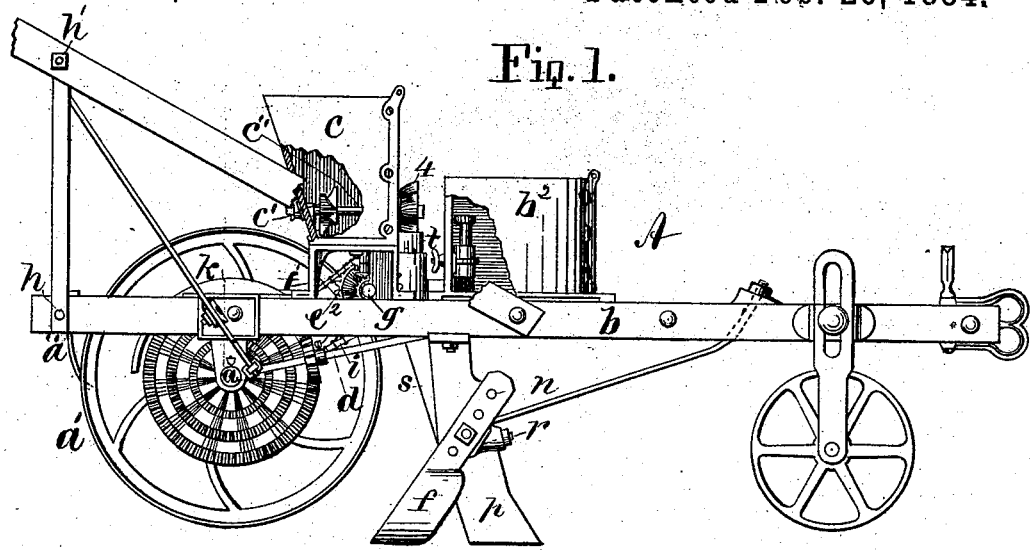
Figure 2:
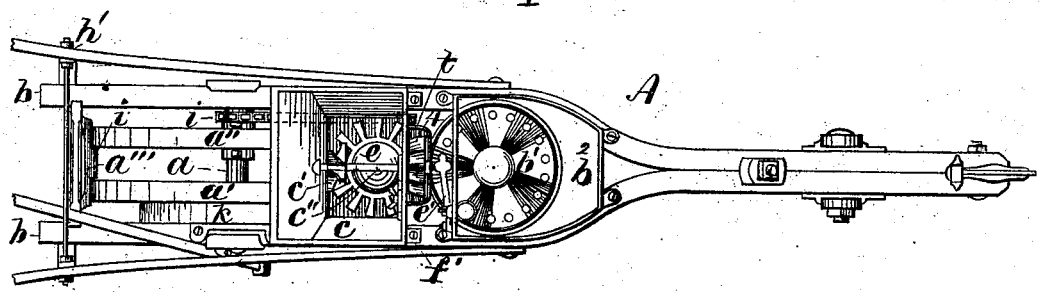
Figure 3:
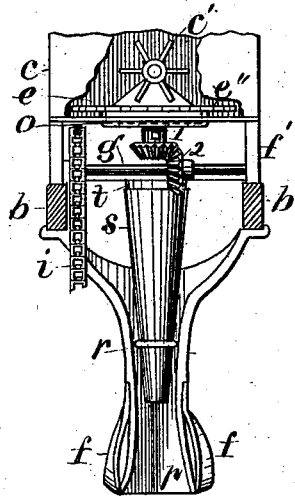
Figure 4:
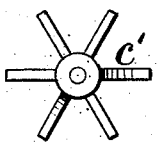
Figure 5:
Figure 6:
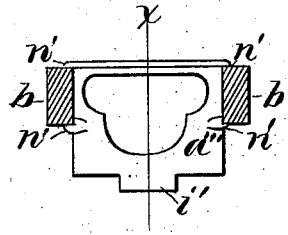
Figure 7:
Figure 8:
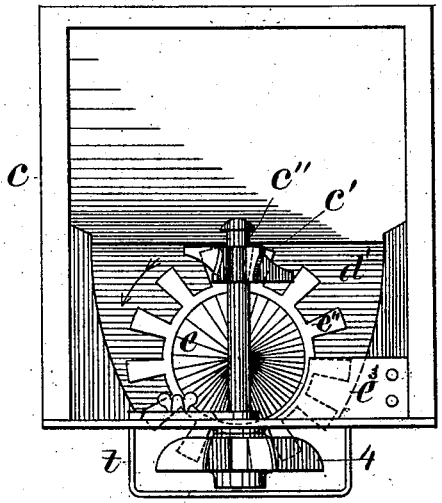
Figure 9:
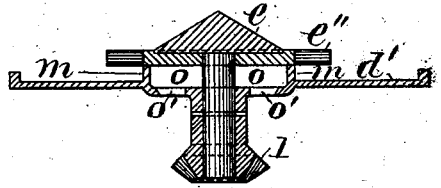

Two sheets of drawings illustrate this invention, Sheet 1, with Figures 1 and 2, and Sheet 2, with Figs. 3, 4, 5, 6, 7, 8, and 9. Fig. 1 is a side elevation of a one-horse corn-drill which embodies my improvements. Fig. 2 is a top view of the same. Fig. 3 is a vertical section through the side bars of the frame behind the fertilizer-hopper, and shows the gearing for operating the fertilizer-disk, the discharge-tube, and furrow-opener in rear elevation. Fig. 4 is an end view of the stirrer-wheel, and Fig. 5 is a face view of the same. Fig. 6 is a side view of the scraper-plate; Fig. 7, a vertical section of the same through line $x$, Fig. 6. Fig. 8 is a top view of the hopper enlarged. Fig. 9 is a central vertical section through the fertilizer disk or wheel and the hopper-bottom in which it is pivoted.

In the views 1 and 2, A is the machine, which has bent frame-bars $b$, parallel from their rear ends forward, and united together in front of the corn-hopper, and extending thence to the clevis end, and bolted together to form one piece. This frame is mounted upon the bearings of a pair of drive-wheels, $a'$ and $a''$, which are centered upon the same axle. Wheel $a'$ is provided with a series of concentric gears, and has a pinion engaging therewith on a shaft, $d$, connecting with and operating the seed-plate $b'$. A sprocket-wheel on the axle outside of the wheel $a''$ drives the fertilizer-disk $e$ through chain $i$ and the sprocket-wheel $e^2$ on the outer end of the transverse shaft $g$, which extends across the frame under the fertilizer-hopper, and drives the bevel-wheels 2 and 1, as seen in Fig. 3. Bevel-gear 1 is attached at the lower end of the upright shaft of the fertilizer-disk. This disk, as seen in the view Fig. 2, has long radial open teeth, similar to the construction shown in my application for fertilizer attachment to two-horse planter now on file in the United States Patent Office; but instead of being driven by the discharging-wheel 4, (seen on the outside of the hopper $c$,) it is driven by the bevel-gear 2 and 1 under the bottom of its hopper, as before mentioned. A shaft, $c''$, extends through the fertilizer-hopper from front to rear, having on the front end, outside of the hopper, the discharge-wheel 4, the teeth of which pass through the open spaces between the teeth $e''$ of the fertilizer-disk $e$, which extend out in front beyond the wall of the hopper for that purpose. The discharge-wheel 4 and its shaft, with the stirrer shown, are driven by the fertilizer-disk. The wheel 4 is used as a cleaner, its object being to push out the fertilizer substance from between the teeth $e''$ of wheel $e$, as they successively pass under it. At the rear end of the shaft $c''$, near the rear wall of the hopper $c$, a stirrer-wheel, $c'$, is attached thereon. It has teeth alternately inclined upon opposite sides, to allow them to free themselves from the fertilizer-dust as it rotates.

The marked difference between the mode of dropping the fertilizer in this device from that shown in my previous application before mentioned should be noticed. In that device the disk $e$ is driven by the pinion or wheel 4, (which meshes in its teeth outside the hopper,) the wheel 4 performing the double function of driving the disk and pushing out the fertilizer substance from between its teeth at the same time, while in this the disk is driven from separate gearing under the hopper, as before stated. The fertilizer-disk $e$ is elevated above the bottom plate, $d'$, of the hopper $c$, so as to leave a considerable space under it, and the bottom plate has an elevated annular ring, $m$, on which the central portion of the disk rotates, forming a hollow chamber, $o$, under it. This chamber has holes $o'$ in the bottom of the same, to allow any fertilizer-dust that may possibly work under the disk to fall out. By having the disk thus elevated above the bottom of the hopper it will not only rotate more freely, but it obviates any stoppage of the disk from the packing of the fertilizer compound under it. The ring $m$ is a thin circular vertical flange. The discharge-wheel 4 is partially inclosed by the open end of tube $t$, to prevent the escape of the fertilizer-dust. The upper section of this tube is cast in one piece with the hopper-bottom.

The seed-disk of the planter extends out through the rear wall of the corn-hopper, to allow it to discharge in the same tube with the fertilizer, both the fertilizer substance and corn being dropped simultaneously and falling together into the furrow through the lower section, $s$, of the discharge-tube, which latter is secured within the hollow of the plow-standard by the eyebolt $r$.

The coverers $f$ are made adjustable upon the plow-standard $p$ by a series of holes, $n$, in their shank ends, and they extend backward at a suitable angle, and curve inward at an angle with the furrow, as seen in Figs. 1 and 3, so as to sweep the loose earth over the corn. Between the rear ends of the frame-bars $b$ is a scraper-blade, $a'''$, as seen in the views Figs. 1, 2, 6, and 7. It consists of a broad blade having its lower end, $i'$, curved inward, and a shoulder upon either side of the middle part, which extends between the rims of the wheels $a'$ and $a''$, as seen in Figs. 1 and 2, to clean them. It has end lugs, $n'$, which extend out upon the upper and under surfaces of bars $b$, and a bolt, $h$, secures it between the latter.

In operating my device, as the machine moves forward, the seed devices are set in motion by the shaft $d$, connecting them with the drive-gear, while at the same time motion is communicated to the fertilizer-disk through the sprocket-wheels, drive-chain, and bevel-gearing, and both disks are made to drop simultaneously. Variations in the distance of the kernels of corn apart are of course obtained by change of seed-plates and the shifting of the pinion engaging the concentric gear on wheel $a'$.

The shield $e'$ (seen in Fig. 8) in the bottom of the hopper $c$, in the front right-hand corner, consists of a broad piece of sheet metal extending down from the side and over the teeth of the fertilizer-disk to the central cone. It is riveted to the side of the hopper, and its object is to prevent any of the fertilizer substance from being lost through the slot or opening in the hopper-front on that side of the same where the teeth $e''$ of the disk return into said hopper as it is rotated.

I claim as my invention—

1. A bottom plate for a fertilizer-hopper, having an inclosed ring cast upon or attached thereto under the feed-disk, whereby the latter is elevated above said bottom plate, and the fertilizer substance prevented from packing between the disk and the bottom plate of the fertilizer-hopper.

2. In a bottom plate for a fertilizer-hopper having a horizontal feed-disk rotating over the same, a chamber formed under the middle portion of said disk in the hopper-bottom by means of an endless flange or ring, upon which said disk rotates, said chamber having a hole or holes leading out through the bottom plate under it, to allow the escape of any fertilizer-dust that may have worked its way between the bearing-ring and the body of the disk.

AUSTIN C. EVANS.

Attest:
M. M. CONVERSE,
B. C. CONVERSE.